(12) United States Patent
Kim et al.

(10) Patent No.: US 12,432,314 B2
(45) Date of Patent: Sep. 30, 2025

(54) DISPLAY DEVICE

(71) Applicant: LG ELECTRONICS INC., Seoul (KR)

(72) Inventors: Chulki Kim, Seoul (KR); Jaehyung Jeon, Seoul (KR); Kwangho Choi, Seoul (KR); Hyongil Kil, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/701,742

(22) PCT Filed: Nov. 2, 2021

(86) PCT No.: PCT/KR2021/015702
§ 371 (c)(1),
(2) Date: Apr. 16, 2024

(87) PCT Pub. No.: WO2023/080265
PCT Pub. Date: May 11, 2023

(65) Prior Publication Data
US 2025/0030813 A1 Jan. 23, 2025

(51) Int. Cl.
H04N 5/655 (2006.01)
F16M 11/18 (2006.01)

(52) U.S. Cl.
CPC ............. *H04N 5/655* (2013.01); *F16M 11/18* (2013.01); *F16M 2200/08* (2013.01)

(58) Field of Classification Search
CPC .......... H04N 5/655; H04N 5/64; F16M 11/18; F16M 2200/08; F16M 11/22; F16M 11/10
See application file for complete search history.

(56) References Cited

U.S. PATENT DOCUMENTS 10,584,824 B1 * 3/2020 Roberts .................... H04R 1/08
2010/0309618 A1 12/2010 Park
(Continued)

FOREIGN PATENT DOCUMENTS

CN 105697950 6/2016
CN 112696571 4/2021
(Continued)

OTHER PUBLICATIONS

PCT International Application No. PCT/KR2021/015702, International Search Report dated Jul. 22, 2022, 12 pages.
(Continued)

*Primary Examiner* — Fernando Alcon
(74) *Attorney, Agent, or Firm* — LEE, HONG, DEGERMAN, KANG & WAIMEY

(57) ABSTRACT

A display device comprises: a display module outputting an image; a pair of hinge brackets located on the lower portion of the display module; and a pair of stands which are rotatably coupled to the hinge brackets and each comprise a long leg and a short leg which are extended with a certain angle therebetween, wherein the stand is rotated to transform into one of a first state in which both the long leg and the short leg come into contact with a holding surface and a second state in which only the long leg comes into contact with the holding surface, and thus, the height of the display module is easily switched.

11 Claims, 11 Drawing Sheets

(56) References Cited

U.S. PATENT DOCUMENTS

| | | | |
|---|---|---|---|
| 2011/0180674 A1* | 7/2011 | Bliven | F16M 11/10 |
| | | | 248/176.1 |
| 2013/0070172 A1* | 3/2013 | Ooe | H05K 7/20972 |
| | | | 361/695 |
| 2014/0353453 A1* | 12/2014 | Quijano | F16M 11/18 |
| | | | 248/419 |
| 2018/0302995 A1 | 10/2018 | Hasegawa et al. | |
| 2019/0390942 A1* | 12/2019 | Chenoweth | F16M 11/38 |
| 2021/0059401 A1* | 3/2021 | Perelli | A47B 97/04 |
| 2024/0126350 A1* | 4/2024 | Ki | G06F 1/1605 |
| 2024/0410518 A1* | 12/2024 | Kim | F16M 11/18 |
| 2025/0081370 A1* | 3/2025 | Ahn | G06F 1/1601 |

FOREIGN PATENT DOCUMENTS

| | | | | |
|---|---|---|---|---|
| JP | 11-331735 | 11/1999 | | |
| JP | 2000-347584 | 12/2000 | | |
| JP | 2021019911 | 2/2021 | | |
| KR | 10-2005-0095755 | 9/2005 | | |
| WO | WO-2014119992 A1 * | 8/2014 | | A45C 11/00 |
| WO | WO-2017098711 A1 * | 6/2017 | | F16M 11/04 |

OTHER PUBLICATIONS

European Patent Office Application Serial No. 21963365.8, Search Report dated Jul. 23, 2025, 7 pages.

* cited by examiner (a)

(b)

(c)

(d)

(a)

(b)

(a)

(b)

(a)

(b)

DISPLAY DEVICE

CROSS-REFERENCE TO RELATED APPLICATION(S)

This application is the National Stage filing under 35 U.S.C. 371 of International Application No. PCT/KR2021/015702, filed on Nov. 2, 2021, the contents of which is hereby incorporated by reference herein in its entirety.

TECHNICAL FIELD

The present disclosure relates to a display device including a stand for adjusting a height of a main body.

BACKGROUND

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

The display device may be mounted in various ways. It is common to place the display device on a decoration cabinet or a table, or to hang the display device on a wall, but recently, a type that stands on the floor is preferred because this provides a picture-frame-like appearance.

When a display device is mounted on a decoration cabinet, the height of the decoration cabinet may be adjusted, and when the display device is hung on a wall by adjusting an installation position on the wall, the mobile device may be mounted according to the height of a sitting and viewing position of a user. However, in the case of a stand that stands directly on the floor, when the length of the stand may not be adjusted, the display device may be mounted at an inappropriate height for viewing.

Depending on the user, some users want to place a display device on a decoration cabinet, and the number of users who want to change a level at which the display device is placed depending on a situation increases, and thus a need for a display device for adjusting the height of the stand increases.

DISCLOSURE

Technical Problem

An embodiment of the present disclosure is to provide a display device including a stand for easily adjusting a height of a main body.

Technical Solution

The present disclosure provides a display device including a display module configured to output an image, a pair of hinge brackets located below the display module, a pair of stands rotatably coupled to the hinge bracket and including a long leg and a short leg that extend at a predetermined angle, wherein the stand rotates to change to one state of a first state in which both the long leg and the short leg come into contact with a mounting surface and a second state in which only the long leg comes into contact with the mounting surface.

The hinge bracket may include a fastening surface in contact with a connector between the long leg and the short leg of the stand.

The fastening surface may be located obliquely toward a center of the display device.

The display device may further include a bolt coupled to the fastening surface to pass through the stand, and the bolt may be coupled obliquely toward left and right ends of the display device based on a vertical direction.

The display device may further include a bracket unevenness formed on the hinge bracket, and a stand unevenness formed on the stand and engaged with and coupled to the bracket unevenness, and the stand unevenness may fix a location of the stand when being engaged with and coupled to the bracket unevenness.

The bracket unevenness may include a first unevenness coupled to the stand unevenness in the first state and a second unevenness coupled to the stand unevenness in the second state.

The display device may further include a spring located between a head of the bolt and the stand and configured to provide elasticity in a direction in which the stand is attached to the hinge bracket.

The display device may further include a back leg coupled to a rear surface of the display module in the second state.

In the second state, the long leg may extend in a forward direction beyond the display module, and a pair of long legs may spread outward to left and right.

The display device may further include a back bracket configured to couple the back leg to the rear surface of the display module, and the back bracket may include a plurality of fastening positions on the back leg.

The back bracket may include a hinge configured to adjust an angle of the back leg.

The back leg may rotate in the second state to support the display module toward a rear surface.

The back leg may be variable with a length reduced in the first state.

Advantageous Effects

The display device according to the present disclosure may easily change the height of the display module.

A user may change a viewing height of the display device by simply rotating the stand 211 without a need to reassemble or adjust the length to adjust the height, which has an effect of improving usability.

There are not many accessories and the configuration is simple, and thus manufacturing costs are reduced and the user may operate the display device easily.

Effects obtainable from the present disclosure may be non-limited by the above-mentioned effects. And, other unmentioned effects can be clearly understood from the following description by those having ordinary skill in the technical field to which the present disclosure pertains.

BEST MODE

Figure 1:
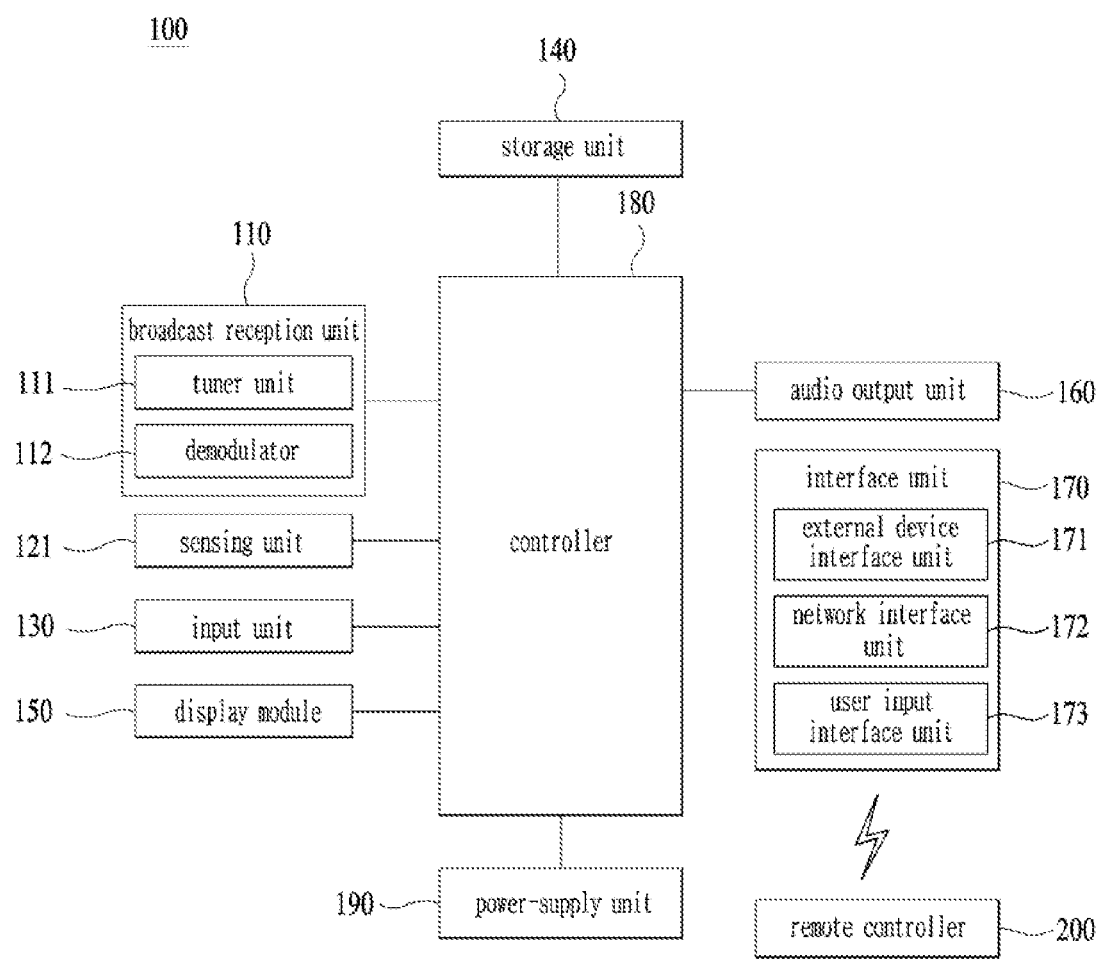
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100. The display device 100 may include a broadcast reception unit 110, an external device interface unit 171, a network interface unit 172, a storage unit 140, a user input interface unit 173, an input unit 130, a controller 180, a display module 150, an audio output unit 160, and/or a power supply unit 190.

The broadcast reception unit 110 may include a tuner unit 111 and a demodulation unit 112.

Unlike the figure, on the other hand, the display device 100 may include only the external device interface unit 171 and the network interface unit 172, among the broadcast reception unit 110, the external device interface unit 171, and the network interface unit 172. That is, the display device 100 may not include the broadcast reception unit 110.

The tuner unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

For example, when the selected broadcast signal is a digital broadcast signal, the tuner unit 111 may convert the broadcast signal into a digital IF (DIF) signal, and when the selected broadcast signal is an analog broadcast signal, the tuner unit 111 may convert the broadcast signal into an analog baseband video or audio (CVBS/SIF) signal. That is, the tuner unit 111 may process the digital broadcast signal or the analog broadcast signal. The analog baseband video or audio (CVBS/SIF) signal output from the tuner unit 111 may be directly input to the controller 180.

Meanwhile, the tuner unit 111 may sequentially select broadcast signals of all broadcast channels stored through a channel memory function, among received broadcast signals, and may convert each of the selected broadcast signals into an intermediate frequency signal or a baseband video or audio signal.

Meanwhile, the tuner unit 111 may include a plurality of tuners in order to receive broadcast signals of a plurality of channels. Alternatively, a single tuner may simultaneously receive broadcast signals of a plurality of channels.

The demodulation unit 112 may receive the digital IF (DIF) signal converted by the tuner unit 111, and may perform demodulation. After performing demodulation and channel decryption, the demodulation unit 112 may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 150, and may output audio through the audio output unit 160.

The sensing unit 120 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

The controller 180 may check the state of the display device 100 based on information collected by the sensing unit, and when a problem occurs, may inform a user of the same or may solve the problem, whereby the controller may perform control such that the display device is maintained in the best state.

In addition, the controller may differently control the content, quality, and size of an image provided to the display module 150 based on a viewer or ambient light sensed by the sensing unit in order to provide the optimum viewing environment. With progress of a smart TV, a large number of functions have been loaded in the display device, and the sensing unit 20 has also been increased in number.

The input unit 130 may be provided at one side of a main body of the display device 100. For example, the input unit 130 may include a touchpad or a physical button. The input unit 130 may receive various user commands related to the operation of the display device 100, and may transmit control signals corresponding to the received commands to the controller 180.

With a decrease in size of a bezel of the display device 100, many display devices 100 have been configured such that the number of physical button type input units 130 exposed to the outside is minimized in recent years. Instead, a minimum number of physical buttons is located at the rear surface or the side surface of the display device, and the display device may receive user input through the touchpad or the user input interface unit 173, a description of which will follow, using a remote controller 200.

The storage unit 140 may store programs for signal processing and control in the controller 180, and may store a processed image, audio, or data signal. For example, the storage unit 140 may store application programs designed to execute various tasks that can be processed by the controller 180, and may selectively provide some of the stored application programs in response to request of the controller 180.

Programs stored in the storage unit 140 are not particularly restricted as long as the programs can be executed by the controller 180. The storage unit 140 may temporarily store an image, audio, or data signal received from an external device through the external device interface unit 171. The storage unit 140 may store information about a predetermined broadcast channel through a channel memory function, such as a channel map.

FIG. 1 shows an embodiment in which the storage unit 140 and the controller 180 are separately provided; however, the present disclosure is not limited thereto. The storage unit 140 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD).

The display module 150 may convert an image signal, a data signal, an OSD signal, and a control signal processed by the controller 180 or an image signal, a data signal, and a control signal received from the interface unit 171 to generate a driving signal. The display module 150 may include a display panel 181 having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 150, and a 3D display may also be used. The 3D display 130 may be classified as a non-glasses type display or a glasses type display.

The display device includes a display module, which occupies a major portion of the front surface thereof, and a case configured to cover the rear surface and the side surface of the display module, the case being configured to package the display module.

In recent years, the display device 100 has used a flexible display module 150, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface.

Meanwhile, the display module 150 may be constituted by a touchscreen, whereby an input device may also be used in addition to an output device.

The audio output unit 160 receives an audio signal processed by the controller 180 and outputs the same as audio.

The interface unit 170 serves as a path to various kinds of external devices connected to the display device 100. The interface unit may include a wireless system using an antenna as well as a wired system configured to transmit and receive data through a cable.

The interface unit 170 may include at least one of a wired/wireless headset port, an external charger port, a wired/wireless data port, a memory card port, a port for connection with a device having an identification module, an audio input/output (I/O) port, a video input/output (I/O) port, and an earphone port.

The broadcast reception unit 110 may be included as an example of the wireless system, and a mobile communication signal, a short-range communication signal, and a wireless Internet signal as well as a broadcast signal may be included.

The external device interface unit 171 may transmit or receive data to or from a connected external device. To this end, the external device interface unit 171 may include an A/V input and output unit (not shown).

The external device interface unit 171 may be connected to an external device, such as a digital versatile disc (DVD) player, a Blu-ray player, a game console, a camera, a camcorder, a computer (laptop computer), or a set-top box, in wired/wireless manner, and may perform input/output operation for the external device.

In addition, the external device interface unit 171 may establish a communication network with various remote controllers 200 in order to receive a control signal related to the operation of the display device 100 from each remote controller 200 or to transmit data related to the operation of the display device 100 to each remote controller 200.

The external device interface unit 171 may include a wireless communication unit (not shown) for short-range wireless communication with another electronic device. The external device interface unit 171 may exchange data with a mobile terminal adjacent thereto through the wireless communication unit (not shown). Particularly, in a mirroring mode, the external device interface unit 171 may receive device information, information of an application that is executed, and an image of the application from the mobile terminal.

The network interface unit 172 may provide an interface for connection of the display device 100 with a wired/wireless network including the Internet. For example, the network interface unit 172 may receive content or data provided by an Internet or content provider or a network operator through the network. Meanwhile, the network interface unit 172 may include a communication module (not shown) for connection with the wired/wireless network.

The external device interface unit 171 and/or the network interface unit 172 may include a communication module for short-range communication, such as Wi-Fi, Bluetooth, Bluetooth Low Energy (BLE), ZigBee, or Near Field Communication (NFC), or a communication module for cellular communication, such as Long-Term Evolution (LTE), LTE Advance (LTE-A), Code Division Multiple Access (CDMA), Wideband CDMA (WCDMA), Universal Mobile Telecommunications System (UMTS), or Wireless Broadband (WiBro).

The user input interface unit 173 may transmit a user input signal to the controller 180, or may transmit a signal from the controller 180 to a user. For example, the user input interface unit may transmit/receive a user input signal, such as power on/off, channel selection, or screen setting, to/from the remote controller 200, may transmit a user input signal, such as a power key, a channel key, a volume key, or a setting value, input from a local key (not shown) to the controller 180, may transmit a user input signal input from a sensor unit (not shown) configured to sense user gesture to the controller 180, or may transmit a signal from the controller 180 to the sensor unit.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit 111, the demodulation unit 112, the external device interface unit 171, or the network interface unit 172, or may process demultiplexed signals to generate and output a signal for image or audio output.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 160. In addition, the audio signal processed by the controller 180 may be input to an external output device through the external device interface unit 171. Although not shown in FIG. 2, the controller 180 may include a demultiplexing unit and an image processing unit, which will be described below with reference to FIG. 3.

Further, the controller 180 may control the overall operation of the display device 100. For example, the controller 180 may control the tuner unit 111 such that a broadcast corresponding to a channel selected by a user or a pre-stored channel is tuned.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera; however, the present disclosure is not limited thereto. The photographing unit may be implemented by a plurality of cameras. Meanwhile, the photographing unit may be embedded in the display device 100 above the display module 150, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 150 corresponding to the location of the user.

The controller 180 may sense user gesture based on the image captured by the photographing unit, a signal sensed by the sensor unit, or a combination thereof.

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit needs to be directly connected to a power cable or needs to be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

The remote controller 200 may transmit user input to the user input interface unit 173. To this end, the remote controller 200 may use Bluetooth communication, radio frequency (RF) communication, infrared radiation communication, ultra-wideband (UWB) communication, or ZigBee communication. In addition, the remote controller 200 may receive an image, audio, or data signal output from the user input interface unit 173 so as to be displayed thereon or audibly output therefrom.

Meanwhile, the display device 100 may be a stationary or movable digital broadcast receiver capable of receiving a digital broadcast.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
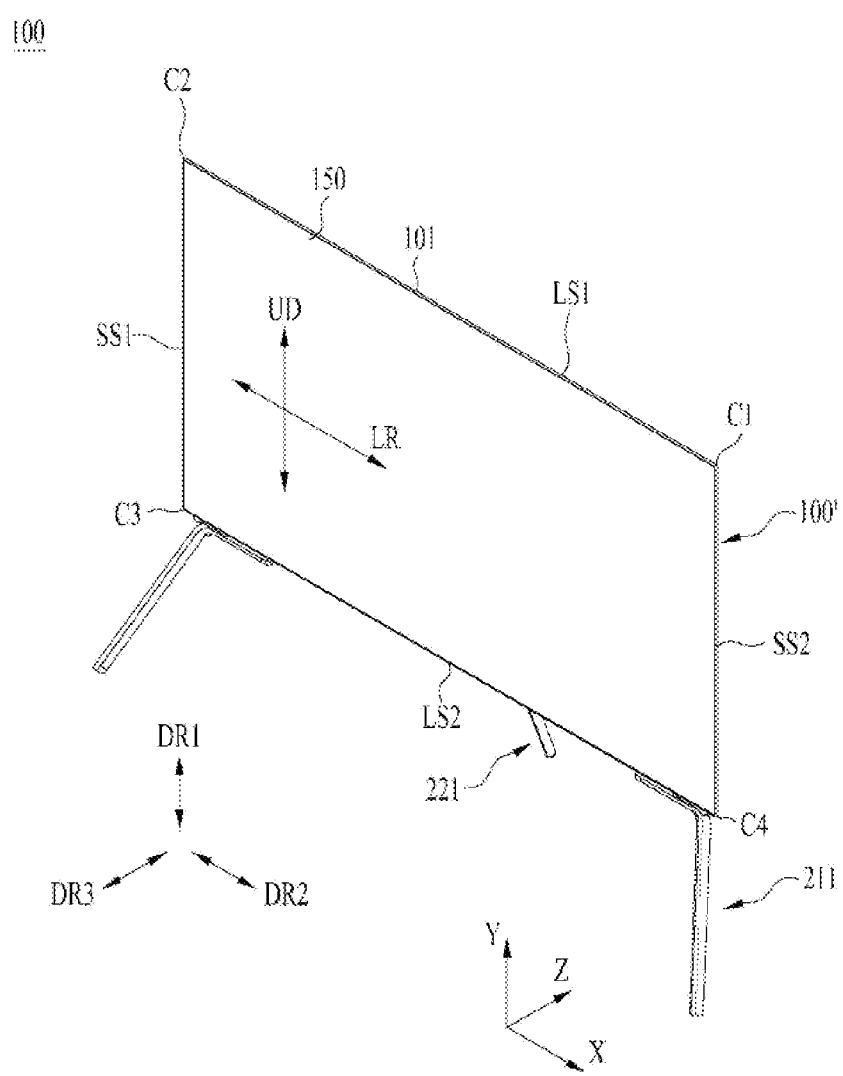
FIG. 2 is a perspective view showing an example of the display device according to the present disclosure.

FIG. 2 is a front perspective view showing an example of the display device.

Referring to FIG. 2, the display device 100 may have a rectangular shape including a first long side LS1, a second long side LS2 opposite the first long side LS1, a first short side SS1 adjacent to the first long side LS1 and the second long side LS2, and a second short side SS2 opposite the first short side SS1.

Here, the area of the first short side SS1 may be referred to as a first side area, the area of the second short side SS2 may be referred to as a second side area opposite the first side area, the area of the first long side LS1 may be referred to as a third side area adjacent to the first side area and the second side area and located between the first side area and the second side area, and the area of the second long side LS2 may be referred to as a fourth side area adjacent to the first side area and the second side area, located between the first side area and the second side area, and opposite the third side area.

In addition, the lengths of the first and second long sides LS1 and LS2 are shown and described as being greater than the lengths of the first and second short sides SS1 and SS2, for convenience of description; however, the lengths of the first and second long sides LS1 and LS2 may be approximately equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

From a different point of view, the side of the display device 100 on which a picture is displayed may be referred to as a front side or a front surface. When the display device 100 displays the picture, the side of the display device 100 from which the picture cannot be viewed may be referred to as a rear side or a rear surface. When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to edges 351 of the display device 100. In addition, points at which the first long side LS1, the second long side LS2, the first short side SS1, and the second short side SS2 are joined to each other may be referred to as corners. For example, a point at which the first long side LS1 and the first short side SS1 are joined to each other may be a first corner C1, a point at which the first long side LS1 and the second short side SS2 are joined to each other may be a second corner C2, a point at which the second short side SS2 and the second long side LS2 are joined to each other may be a third corner C3, and a point at which the second long side LS2 and the first short side SS1 are joined to each other may be a fourth corner C4.

Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as a vertical direction UD.

Figure 3:
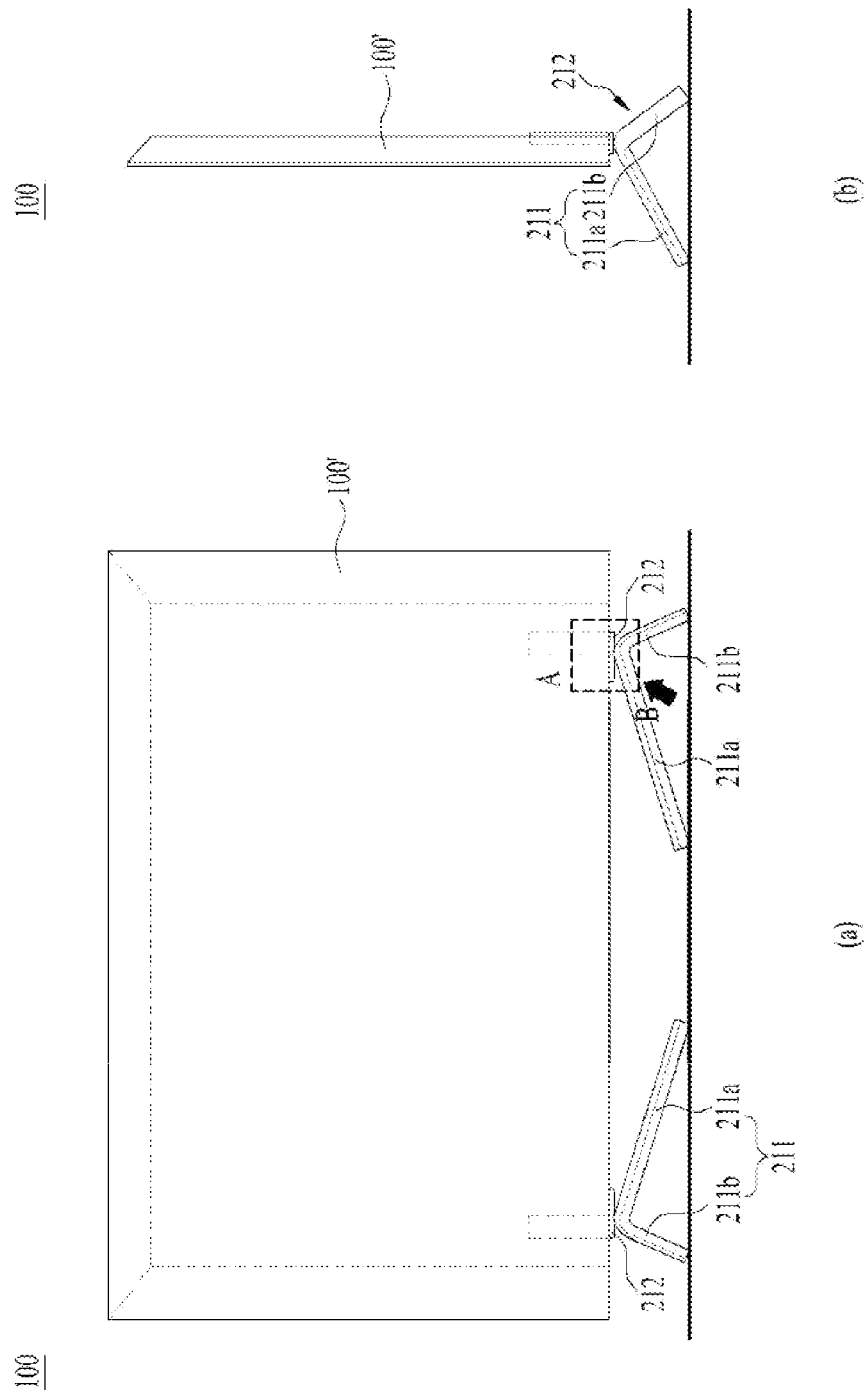
FIG. 3 is a diagram showing a first state of a display device according to the present disclosure.
Figure 4:
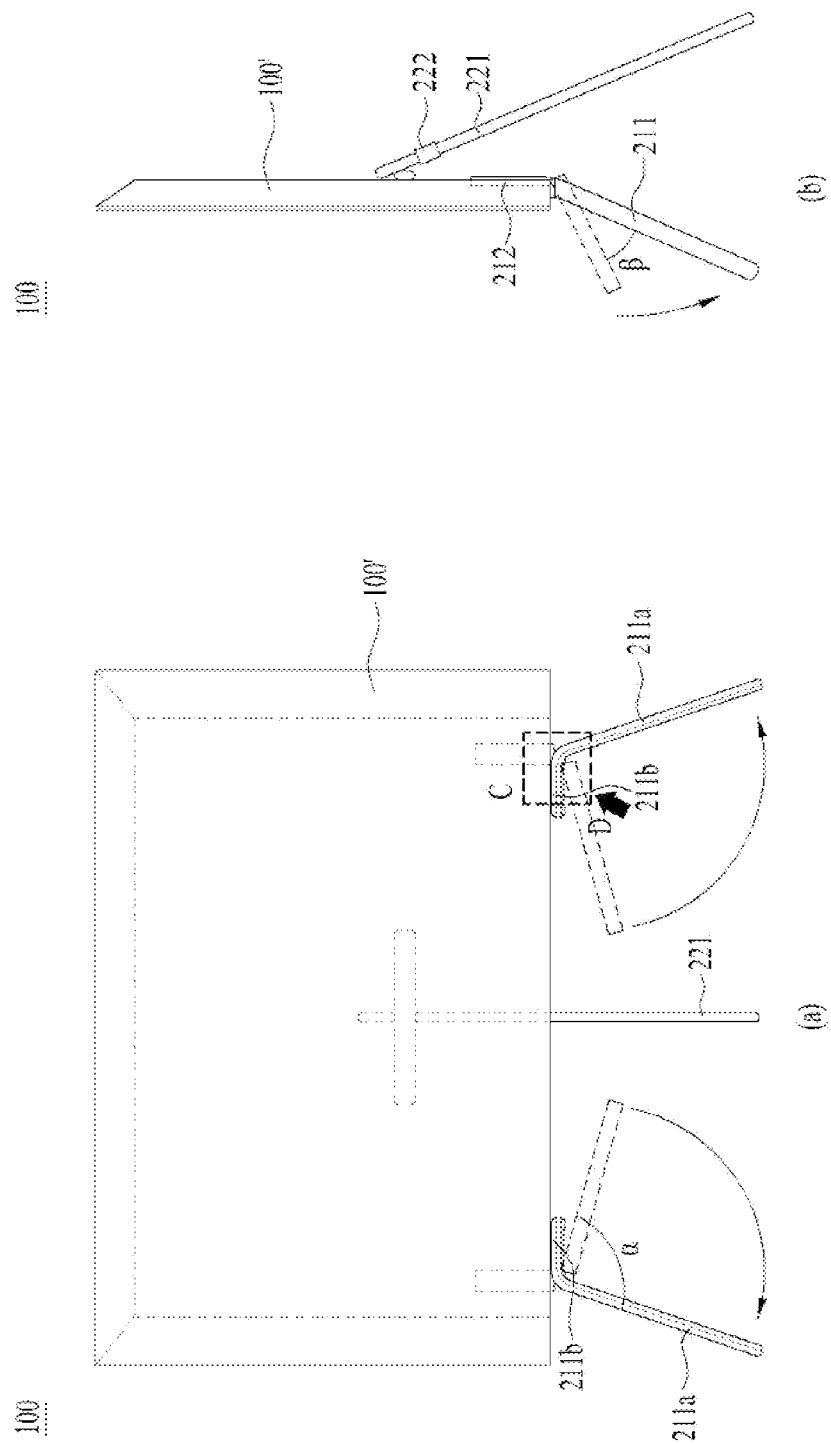
FIG. 4 is a diagram showing a second state of a display device according to the present disclosure.

FIG. 3 is a diagram showing a first state of a display device according to the present disclosure. FIG. 4 is a diagram showing a second state of a display device according to the present disclosure.

The display device according to the present disclosure may be arranged in a low first state as shown in FIG. 3, and may be arranged in a high second state as shown in FIG. 4. The height of a main body including a display module may be adjusted to the height of a cabinet such as a living room cabinet, but recently, a display device designed to be mounted on the floor by using a stand 211 of the display device to provide an atmosphere such as a gallery has appeared.

In this case, it is difficult to adjust the height of a display device with separate furniture, and it is necessary to vary the height of the display device depending on a situation or the arrangement of other furniture of users. For example, the height of the display module may be selected between a low first position and a high second position to apply the display device to both a situation in which a user views a screen while sitting on a low sofa or sitting, and a situation in which the user needs to view the screen from a high eye level, such as standing or a regular chair.

The stand 211, which supports the main body, may be configured to have a variable length such that the height of a main body including the display module on which an image is output may be adjusted. However, the stand 211 with a variable length is likely to be damaged, and it is advantageous in terms of design to use the rigid stand 211 to support a main body with a small thickness and a large area.

The stand 211 of the display device according to the present disclosure may be bent in an L shape and have a pair of legs of different lengths. The stand 211 is arranged symmetrically in pairs and may be rotatably coupled to the main body. When the stand 211 rotates and a portion of the stand 211, which is in contact with a mounting surface, changes, the height of the main body also changes.

As shown in FIG. 3, in the first state, both legs of the stand 211 are in contact with the mounting surface, and based on a front view as in (a) of FIG. 3, a long leg 211*a* and a short leg 211*b* are arranged in left and right directions, and based on a side view as in (b) of FIG. 3, the long leg 211*a* and the short leg 211*b* are arranged in forward and backward directions. The four legs are balanced in the left-right and forward-backward directions, and one pair of legs are placed on the left and right, allowing the display device to be held stably.

As shown in FIG. 4, to place the display device in the second state such that the main body is located at the top, the stand 211 may be rotated such that only the long leg 211*a* is in contact with the mounting surface.

The short leg 211*b* may rotate and positioned at the bottom or on a rear surface of the main body as shown in (a) of FIG. 4. In the present embodiment, the short leg 211*b* is configured to be arranged in parallel to a lower end of the main body.

An angle of the long leg 211*a* of the stand 211 with the main body may be increased, and may be arranged in a vertical direction than in the first state. To ensure that the display device is balanced in the left and right directions, as shown in (a) of FIG. 4, the pair of long legs 211*a* are left and right symmetrical and may extend from a lower part of the main body toward the outside.

However, as shown in (a) of FIG. 4, the short leg 211*b* may not support the floor, and thus the display device is unbalanced in the forward and backward directions, and thus a back leg 221 needs to be further included for balance in forward and backward directions.

As shown in (b) of FIG. 4, the back leg 221 may extend at a predetermined angle from a rear surface of the main body and may include a back bracket 222 that fastens the back leg 221 to the rear surface of the main body.

Hereinafter, with reference to FIGS. 5 to 8, the rotatably coupled stand 211 will be described in more detail.

Figure 5:
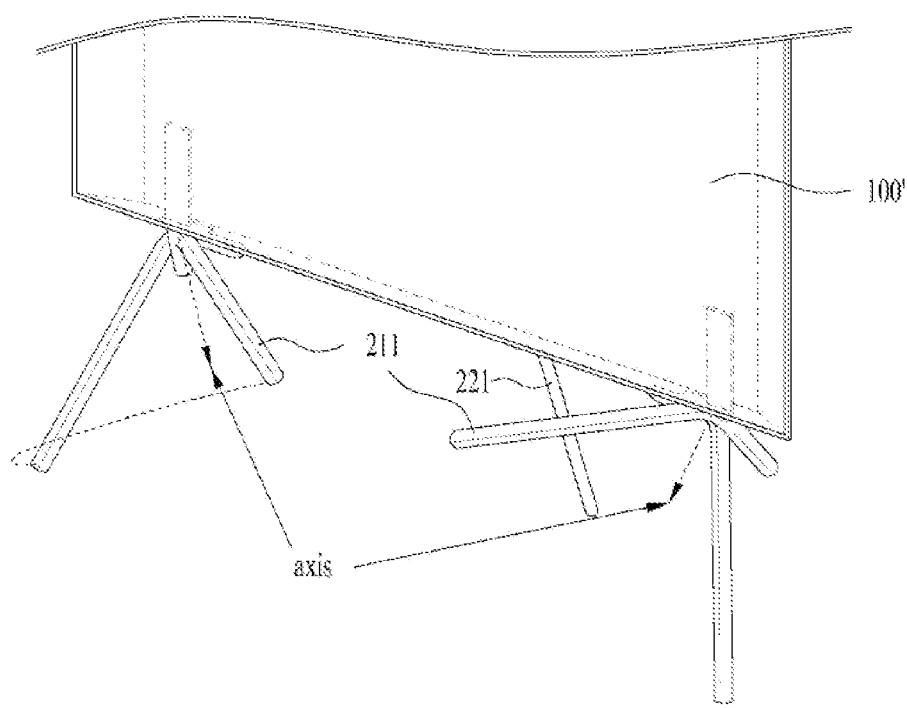
FIG. 5 is a diagram showing a stand in first and second states of a display device according to the present disclosure.

FIG. 5 is a diagram showing the stand 211 in the first and second states of the display device according to the present disclosure. A pair of legs may be connected to each other to form an angle less than 180 degrees and greater than 90 degrees, and may be constructed by bending one pipe member. The process may be simplified compared to constructing the stand 211 by assembling each leg, and it is also advantageous in terms of rigidity.

The stand 211 is rotatably coupled to a hinge bracket 212 located on the rear surface of the main body, and a rotation axis coupled to the hinge bracket 212 is tilted obliquely based on a vertical direction toward the center as shown in FIG. 5.

The stand 211, rotating about an oblique axis, becomes in the first state as shown in FIG. 3 as an angle formed with the main body changes. The second state may be as shown in FIG. 4. Rotation angles of the long leg 211*a* and the short leg 211*b* are the same, and the rotation axis is not vertical at the bottom of the module, and accordingly, angles viewed from the front and side may be different.

Figure 6:
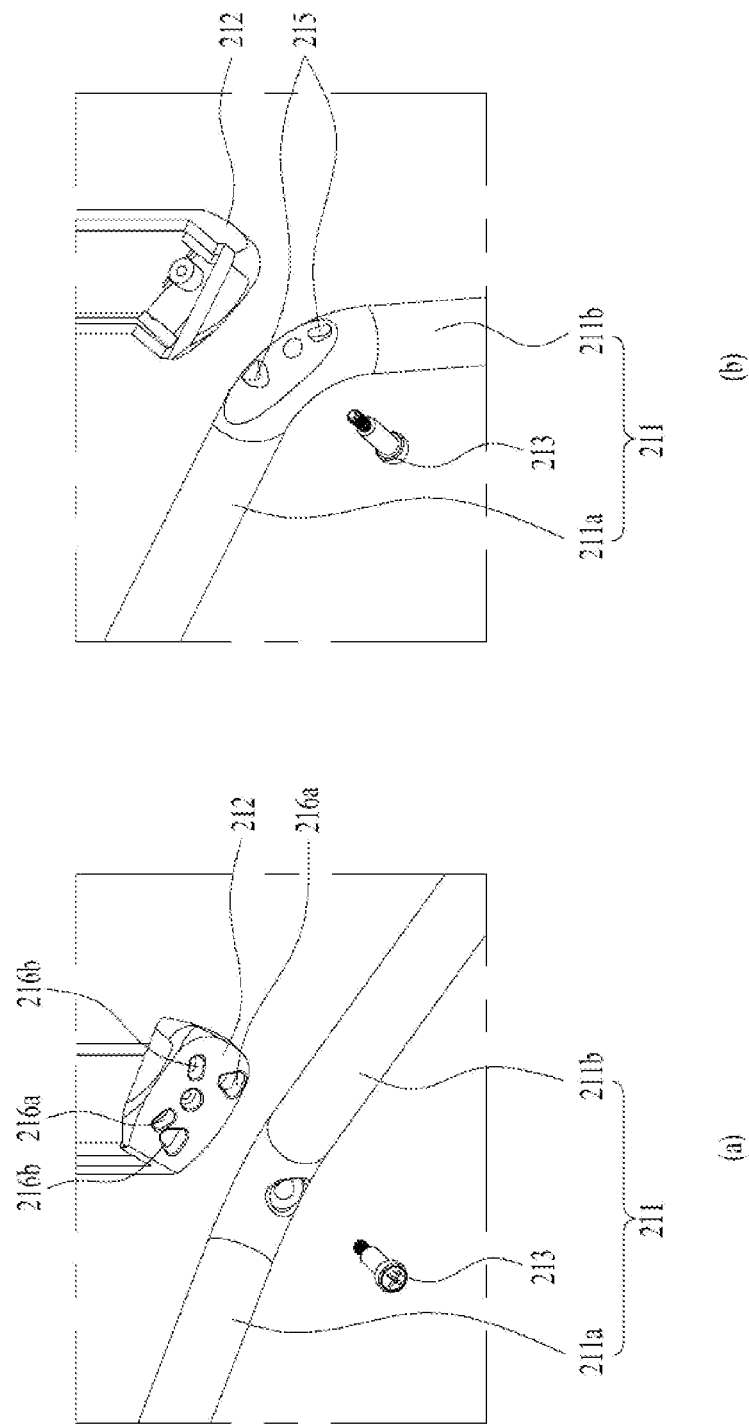
FIG. 6 is an exploded perspective view of a stand and a hinge bracket of a display device according to the present disclosure.

FIG. 6 is an exploded perspective view of the stand 211 and the hinge bracket 212 of a display device according to the present disclosure.

Figure 7:
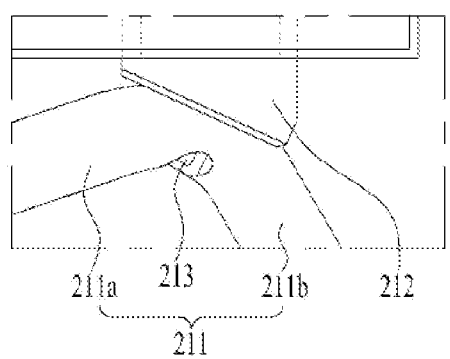
FIG. 7 is an enlarged view of a stand and a hinge bracket of a display device according to the present disclosure.
Figure 7:
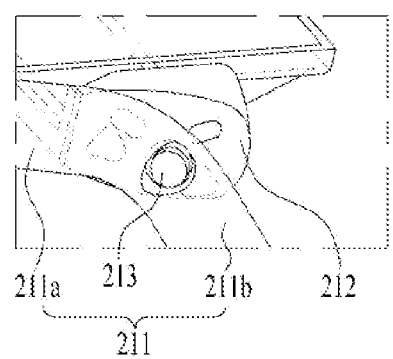
Figure 7:
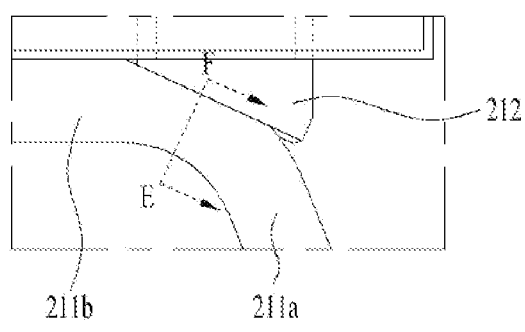
Figure 7:
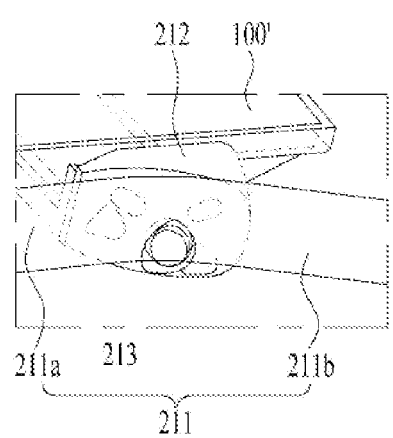

FIG. 7 is an enlarged view of the stand 211 and the hinge bracket 212 of a display device according to the present disclosure. (a) of FIG. 7 is an enlarged view of a region A of (a) of FIG. 3, and (b) of FIG. 7 shows is a perspective view seen in direction B of (a) of FIG. 3 and shows the stand 211 and the hinge bracket 212 in a first state.

(c) of FIG. 7 is an enlarged view of a region C of (a) of FIG. 4. (d) of FIG. 7 shows is a perspective view seen in direction B of (a) of FIG. 4 and shows the stand 211 and the hinge bracket 212 in a second stage.

Figure 8:
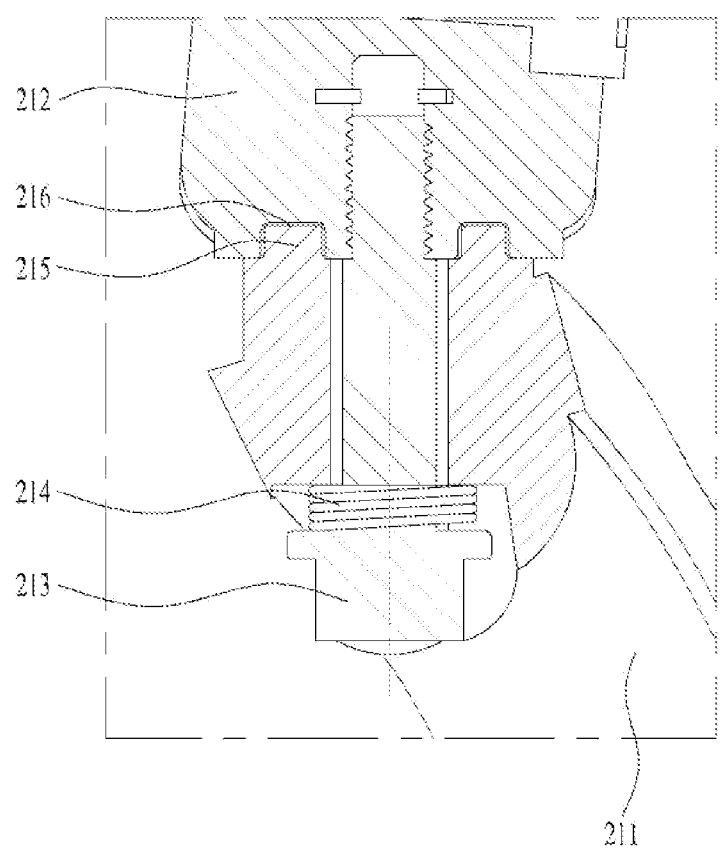
FIG. 8 is a cross-sectional view taken along a line E-E of (c) of FIG. 7.

FIG. 8 is a cross-sectional view taken along a line E-E of (c) of FIG. 7 and is a cross-sectional view of a bolt 213 passing through the stand 211 and the hinge bracket 212.

Referring to FIGS. 6 to 8, the hinge bracket 212 for coupling the stand 211 to a main body, the bolt 213 coupled to the hinge bracket 212 to pass through the stand 211, and a spring 214 for fixing the stand 211 may be provided.

The hinge bracket 212 may be coupled to a rear surface of a display module, and may include a fastening surface at the bottom, which is in contact with a connection portion between the long leg 211*a* and the short leg 211*b* of the stand 211. The fastening surface may have an inclined surface inclined toward the center from the bottom of the display device, as shown in (a) and (c) of FIG. 7.

The fastening surface may include a fastening hole into which the bolt 213 is inserted. The bolt 213 may have a spiral structure that is formed to pass through the connection portion of the long leg 211*a* and the short leg 211*b* of the stand 211, is coupled to a fastening hole of the hinge bracket 212, and prevents the fastening hole and the bolt 213 from being separated from each other. The spiral structure may be omitted such that a portion that passes through the stand 211 is rotatable.

The bolt 213 serves as the axis of rotation around which the stand 211 rotates, and the fastening surface of the bolt 213 is slanted, and thus the bolt 213 may be inserted into the fastening hole to be inclined outward based on a vertical direction.

The spring 214 may be further provided between a head of the bolt 213 and the stand 211, and the spring 214 provides elasticity such that the stand 211 is in close contact with the hinge bracket 212. The spring 214 may push the stand 211 upward in the drawing, and thus the stand 211 may be maintained in the first or second state.

To maintain the first and second states more stably, a bracket unevenness 216 formed on the hinge bracket 212 and a stand unevenness 215 formed on the stand 211 may be provided. The bracket unevenness 216 and the stand unevenness 215 are fastened in the first or second state to fix the stand 211 without rotating. In the drawing, the stand unevenness 215 is shown to have a protruding form and the bracket unevenness 216 is shown to have a groove form, but the opposite configuration may also be used.

The bracket unevenness 216 that fixes the stand 211 in both the first and second states may include a pair of first unevenness 216*a* coupled to the stand unevenness 215 in the first state and a pair of second unevenness 216*b* coupled to the first unevenness 216*a* in the second state. As shown in FIGS. 6 to 8, the pair of stand unevenness 215, the pair of the first unevenness 216*a*, and the pair of the second unevenness 216*b* may be provided to more stably fix the stand 211.

In the first state, when a user rotates the stand 211 with a force greater than a predetermined amount, the spring 214 is compressed, and the stand unevenness 215 and the first unevenness 216*a* are separated from each other, and when an angle corresponding to the second state is reached, the stand unevenness 215 may be coupled to the second unevenness 216*b* to fix the stand 211.

Figure 9:
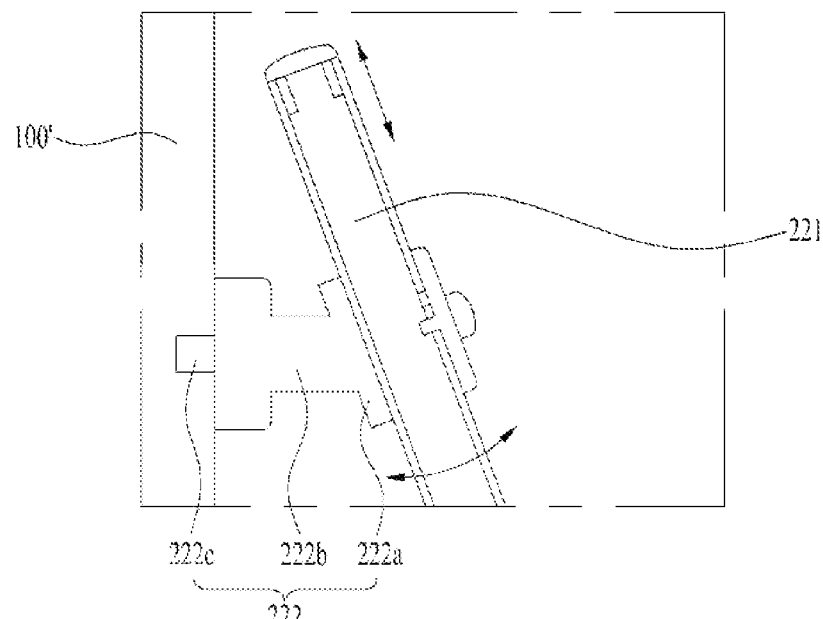
FIG. 9 is a diagram showing a back leg of a display device according to an embodiment of the present disclosure.
Figure 9:
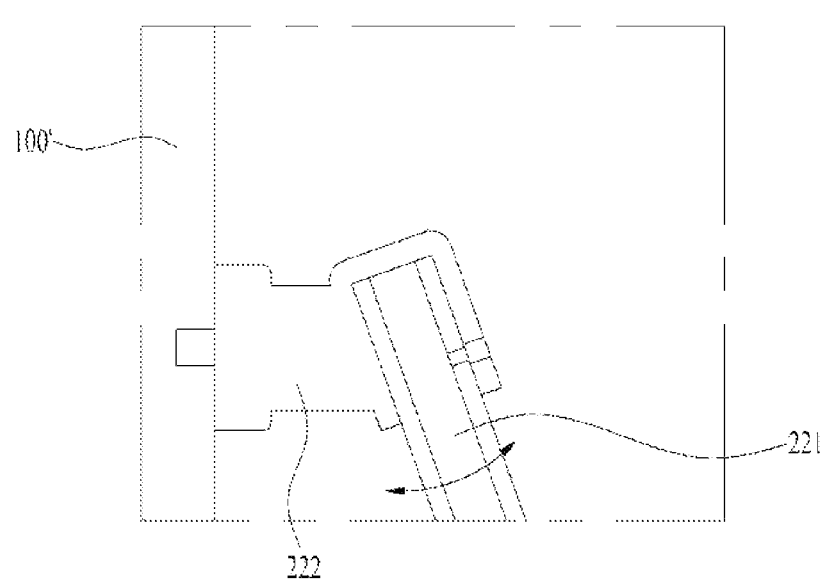

FIG. 9 is a diagram showing the back leg 221 of the display device according to an embodiment of the present disclosure. As described above, in the second state in which the main body is in a high position, only the long legs 211*a* may support the main body by touching the floor, and thus it is difficult to stably support the main body in the forward and backward directions and in the left and right directions with only two legs that do not have wide bottom surfaces. In the left and right directions, the pair of long legs 211*a* may be stably supported by extending toward the outside of the display device, but the display module may fall because the display device is not balanced in the forward and backward directions.

Accordingly, in the second state, the front-to-back balance of the display device may be maintained through the back leg 221 coupled to the rear surface of the main body. Referring to FIG. 9, the back leg 221 may be coupled to the rear surface of the main body through the back bracket 222 coupled to the rear surface of the main body. A screw on a front surface of the back bracket 222 may be inserted and detachable from the rear surface of the main body.

As shown in (a) of FIG. 9, the fastening position of the back leg 221 may be adjusted by configuring the back leg 221 in a penetrating form. When a bottom surface is inclined by changing the fastening position of the back leg 221 to the back bracket 222 or the display device intends to be slightly obliquely mounted, the display device may be stably mounted. The back leg 221 may include a plurality of stopper holes into which a stopper fixed to the back bracket 222 is inserted, and thus the length of the back leg 221 may be adjusted.

As shown in (b) of FIG. 9, a fastening portion with a closed top of the back leg 221 may not adjust the length of the back leg 221, but may instead support the force of the back leg 221, and thus may stably fasten the back leg 221 compared with the back bracket 222 in (a) of FIG. 9.

The back bracket 222 may be configured to adjust the angle of the back leg 221. As shown in FIG. 9, the angle may be adjusted in the forward and backward directions, or may rotate in the left and right directions. This rotation function may be omitted, and in this case, the back leg 221 needs to be removed in the first state and stored separately.

Figure 10:
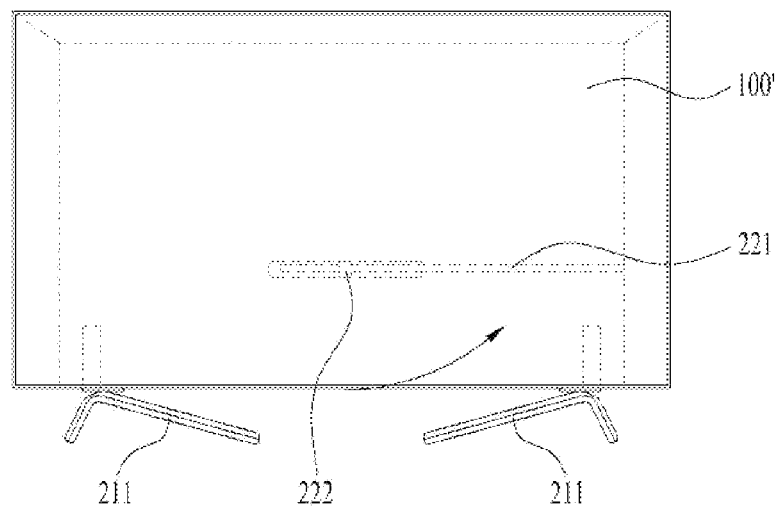
FIGS. 10 and 11 are diagrams showing an operation of a back leg in a first state of a display device according to the present disclosure.
Figure 10:
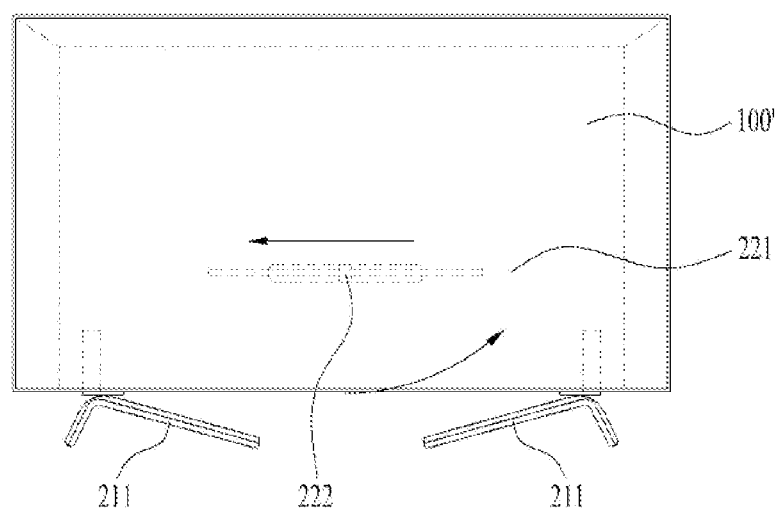
Figure 11:
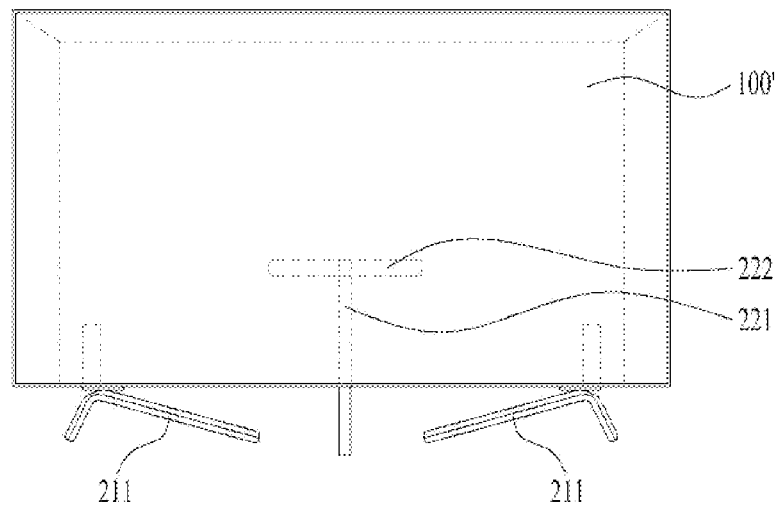
Figure 11:
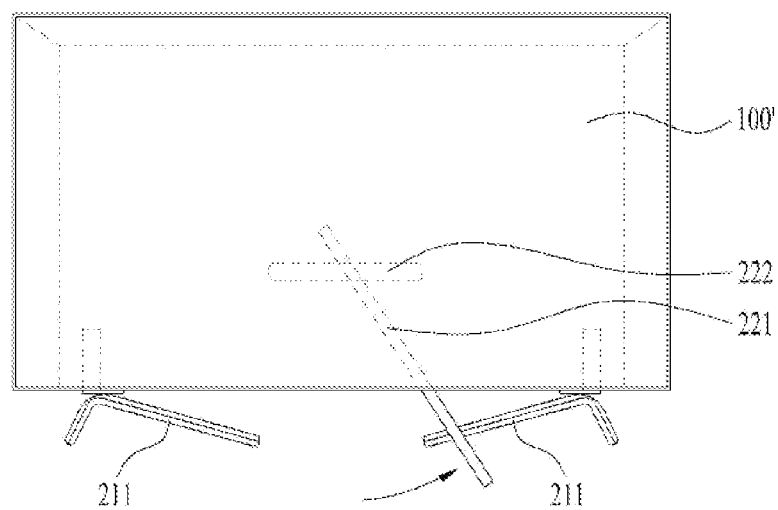

FIGS. 10 and 11 are diagrams showing an operation of the back leg 221 in a first state of a display device according to the present disclosure. As shown in (a) of FIG. 10, the back leg 221 may rotate and may be fixed to a rear surface of a main body to be prevented from being exposed through a front surface.

In the case of a penetrating type fastening portion as shown in (a) of FIG. 9, the back leg 221 may be pushed to be balanced left and right such that the back bracket 222 is located in the center of the back leg 221 as shown in (b) of FIG. 10.

In (a) of FIG. 11, when the length of the back leg 221 may be adjusted in multiple stages, the length of the back leg 221 may be reduced to be supported on the rear surface of the main body even in the first state. In this case, there are five legs supporting the display device, and thus may be mounted more stably.

When the length of the back leg 221 is not variable, the back bracket 222 may be rotated such that the back leg 221 is obliquely located as shown in (b) of FIG. 11 to support the force of inclining the display device toward the rear surface. In the first state, the long leg 211*a* and the short leg of the stand 211 supports the display device, and thus the back leg 221 may function as an auxiliary stand.

The display device according to the present disclosure may easily change the height of the display module.

A user may change a viewing height of the display device by simply rotating the stand 211 without a need to reassemble or adjust the length to adjust the height, which has an effect of improving usability.

There are not many accessories and the configuration is simple, and thus manufacturing costs are reduced and the user may operate the display device easily.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

What is claimed is:

1. A display device comprising:
   a display module configured to output an image;
   a pair of hinge brackets located below the display module;
   a pair of stands rotatably coupled to the hinge bracket and including a long leg and a short leg that extend at a predetermined angle,
   wherein the stand rotates to change to one state of a first state in which both the long leg and the short leg come into contact with a mounting surface and a second state in which only the long leg comes into contact with the mounting surface, and
   wherein the hinge bracket includes a fastening surface in contact with a connector between the long leg and the short leg of the stand, and
   the fastening surface is located obliquely toward a center of the display device.

2. The display device of claim 1, further comprising a bolt coupled to the fastening surface to pass through the stand, wherein the bolt is coupled obliquely toward left and right ends of the display device based on a vertical direction.

3. The display device of claim 2, further comprising:
   a bracket unevenness formed on the hinge bracket; and
   a stand unevenness formed on the stand and engaged with and coupled to the bracket unevenness,
   wherein the stand unevenness fixes a location of the stand when being engaged with and coupled to the bracket unevenness.

4. The display device of claim 3, wherein the bracket unevenness includes:
   a first unevenness coupled to the stand unevenness in the first state; and
   a second unevenness coupled to the stand unevenness in the second state.

5. The display device of claim 3, further comprising a spring located between a head of the bolt and the stand and configured to provide elasticity in a direction in which the stand is attached to the hinge bracket.

6. The display device of claim 1, further comprising a back leg coupled to a rear surface of the display module in the second state.

7. The display device of claim 6, wherein, in the second state, the long leg extends in a forward direction beyond the display module, and a pair of long legs spread outward to left and right.

8. The display device of claim 6, further comprising:
   a back bracket configured to couple the back leg to the rear surface of the display module,
   wherein the back bracket includes a plurality of fastening positions on the back leg.

9. The display device of claim 8, wherein the back bracket includes a hinge configured to adjust an angle of the back leg.

10. The display device of claim 9, wherein the back leg rotates in the second state to support the display module toward a rear surface.

11. The display device of claim 6, wherein the back leg is variable with a length reduced in the first state.

* * * * *